(12) United States Patent
Girardin

(10) Patent No.: US 7,980,619 B1
(45) Date of Patent: Jul. 19, 2011

(54) FLEXIBLE TARP BOW WITH SPRING MEMBER

(76) Inventor: Steve Girardin, Kahoka, MO (US)

( * ) Notice: Subject to any disclaimer, the term of this patent is extended or adjusted under 35 U.S.C. 154(b) by 189 days.

(21) Appl. No.: 12/437,332

(22) Filed: May 7, 2009

(51) Int. Cl.
*B60P 7/02* (2006.01)
(52) U.S. Cl. .................................. 296/100.17
(58) Field of Classification Search ............ 296/100.17, 296/100.15, 100.13, 100.11, 104, 100.16, 296/105, 100.12; 124/44.5, 23.1, 25, 256; 105/377.02; 114/361; 135/32
See application file for complete search history.

(56) References Cited

U.S. PATENT DOCUMENTS

| | | | | |
|---|---|---|---|---|
| 1,491,857 | A * | 4/1924 | Heintz | 296/100.17 |
| 2,529,347 | A * | 11/1950 | Ross, Jr. et al. | 482/126 |
| 2,565,746 | A * | 8/1951 | Turner | 296/104 |
| 3,226,153 | A | 12/1965 | Haid | |
| 3,367,347 | A * | 2/1968 | Smith | 296/100.18 |
| 4,075,723 | A * | 2/1978 | Bareis et al. | 114/361 |
| 4,236,748 | A | 12/1980 | Cloutier et al. | |
| 4,915,439 | A | 4/1990 | Cramaro | |
| 5,038,517 | A * | 8/1991 | Talbott | 47/17 |
| 5,211,441 | A | 5/1993 | Barkus et al. | |
| 5,664,824 | A | 9/1997 | Stephens et al. | |
| 5,752,736 | A * | 5/1998 | Nodier | 296/100.18 |
| 5,921,620 | A * | 7/1999 | Youens | 296/214 |
| RE36,748 | E | 6/2000 | Stephens et al. | |
| 6,378,591 | B1 * | 4/2002 | McCoy | 160/67 |
| 6,612,638 | B1 | 9/2003 | Fliege et al. | |
| 6,983,984 | B2 * | 1/2006 | Garceau | 296/100.17 |
| 7,794,377 | B2 * | 9/2010 | Amzallag et al. | 482/141 |

OTHER PUBLICATIONS

Razor International, www.razorinternational.com, Razor Flexible Tarp Bow Set web site.

* cited by examiner

*Primary Examiner* — Kiran B. Patel
(74) *Attorney, Agent, or Firm* — Brett D. Papendick; Shuttleworth & Ingersoll, PLC

(57) ABSTRACT

An improved tarpaulin bow for use primarily on a vehicle trailer in which the bow is selectively movable in a downward direction. The bow is preferably arched and attached to the sidewalls of a typical open-bed trailer. The arched shape enables the trailer to assume a greater load capacity and a multiplicity of the bows support a tarpaulin which protects the contents of the trailer. The bow comprises two sections connected by spring elements. Downward pressure on either section extends the spring elements allowing the bow to move downward without breaking. Once the downward pressure is removed, the spring elements compress and return the bow to its original position and shape.

7 Claims, 6 Drawing Sheets ial of a tractor-
FLEXIBLE TARP BOW WITH SPRING MEMBER

TECHNICAL FIELD

The invention relates to a structure used to support a tarpaulin on a vehicle, namely an open-bed trailer of a tractor-trailer

BACKGROUND

Vehicles such as tractor trailers and the like transport materials over great distances via highway systems. These materials include gravel, dirt, and other loose materials in which an uncovered or open-bed trailer is utilized for the transport of such materials.

The trailers typically comprise a bottom and four sidewalls with an open top. The open top allows equipment such as a front-end loader to load the materials by emptying the contents of the loader over one of the sidewalls. After the load is transferred into the open-bed trailer, the load may be covered by a tarpaulin. The use of a tarpaulin protects the materials in the trailer from the elements such as wind and precipitation. The tarp also has the added benefit of protecting other motorists from debris leaving the trailer. The prior art utilized rods spanning the width or length of the open top to assist in the support of the tarpaulin.

Improvements were then made to the support rods by giving them an arch shape wherein the central region of the support rod was at a higher elevation than the two ends of the support rod. Hence, the support rods became known as tarpaulin bows or tarp bows. This particular improvement to the support rods allowed a greater load capacity. Furthermore, the arch shape of the support rods allowed water to run off the tarp and over the sides of the flatbed trailer.

Typically, tarp bows are selectively attached to the sidewalls of the trailer by means of a coupling mechanism. The personnel loading an open-bed trailer had two options, one, remove the tarp bows prior to loading, or two, load the trailer while the tarp bows stretch the width of the open-bed trailer. Either option leads to its own disadvantages. Removing the tarp bows increases the expense of manpower and also expends manpower costs in reattaching the tarp bows once the load has been placed in the trailer. The second option leads to damage of the tarp bows due to contact by the frontend loader. As the frontend loader's bucket is positioned over the sidewalls, it is not uncommon for the bucket to make contact with the tarp bows. Depending on the forces exerted on the tarp bows by a frontend loader or other piece of equipment, the bows may be damaged or completely broken. The damaged tarp bows must then be replaced, adding business costs to companies involved in transporting materials.

Improvements were then designed to reduce the time for removal and reattachment of the tarp bows or designed to increase the flexibility of the tarp bows. As an example, Stephens (U.S. Reissue 36,748) utilizes a flexible tarp bow which flexes when the bucket of a frontend loader or similar piece of equipment makes contact with the tarp bow. Similarly, Barkus (U.S. Pat. No. 5,211,441) implements a hinged tarp bow such that the bow can move downward a certain distance. Both inventions sought to reduce the number of tarp bows damaged in the loading process.

SUMMARY OF THE INVENTION

The present invention is a tarpaulin bow comprised of two identical support arms. The two support arms are attached to opposing sidewalls of a typical open-bed trailer of a semi-truck. Once attached to the opposing walls, each support arm spans just over half the width of the trailer. Therefore, support arms are of a length such that there is a portion of the support arms that overlap one another.

The support arms have two ends, the first of which is selectively attachable to the sidewalls of a trailer. The support arms further comprise an upper and lower arm which converge at the first and second ends. The upper arm is curved such that the second end is at a higher elevation than the first end. The change in elevation prevents the buildup of liquids on the tarpaulin. Similarly, the lower arm possesses a higher elevation at the second end than the first ends. The change in elevation allows additional capacity for materials to be stored beneath the tarp bows.

The two support arms are connected by two spring members. Specifically, the spring members connect the lower arms at two points, both of which are within the area of overlap of the two support arms. As each spring member is connected to each of the support arms, the force generated by the springs allows the tarp bow to remain in a raised first position. Additionally, each support arm contains a flange extending from the second end of the support arms. Each flange is positioned so that it extends toward the other support arm in such a way that the other support arm rests upon the flange while in the raised first position.

Once the support arms are connected via the spring members and together span the width of a trailer, the tarp bow may remain in place while the trailer is being loaded with materials. If a piece of equipment makes contact with the support arms and exerts pressure in a downward direction, the support arms may be driven downward toward the floor of the trailer. The lower spring member decompresses allowing the two support arms to move in a downward direction. The upper spring member exerts force upon both support arms such that the support arms remain a similar distance apart in the horizontal plane. Once the downward force exerted on the support arm is released, the lower spring member compresses. The compression has the effect of raising the support arms to their original raised first position in which each support arm rests upon the opposite support arm's flange.

BRIEF DESCRIPTION OF THE DRAWINGS

These and other features and advantages of the present invention will be better understood by reading the following detailed description, taken together with the drawings wherein.

DETAILED DESCRIPTION

Figure 1:
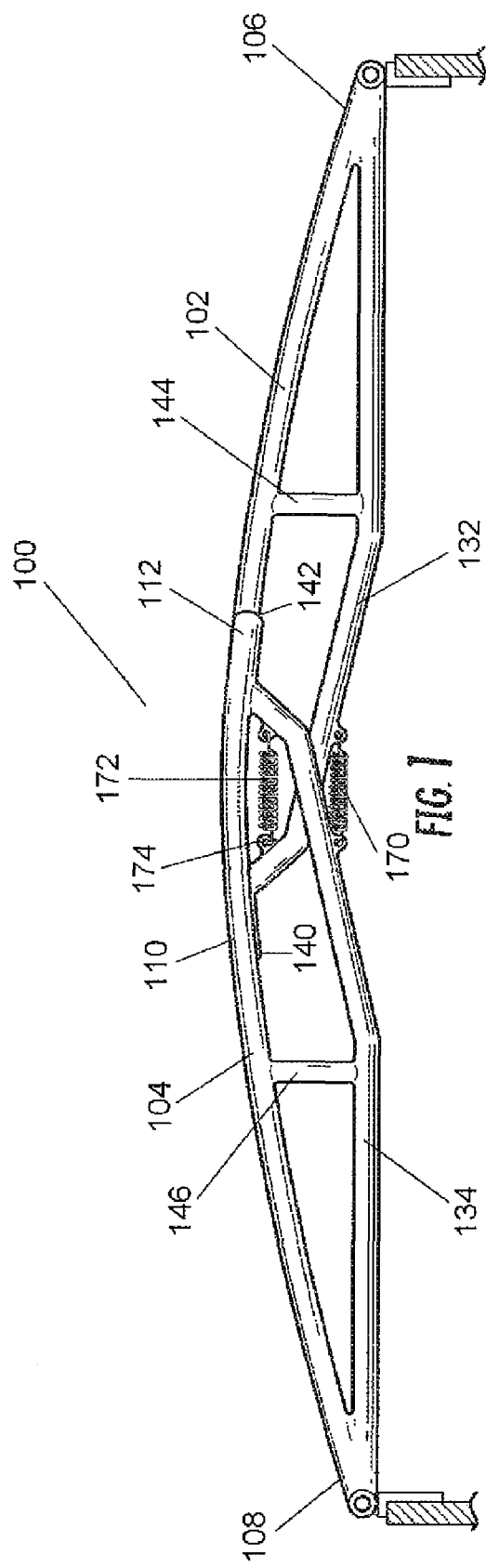
FIG. 1 is a front view of the invention.
Figure 2:
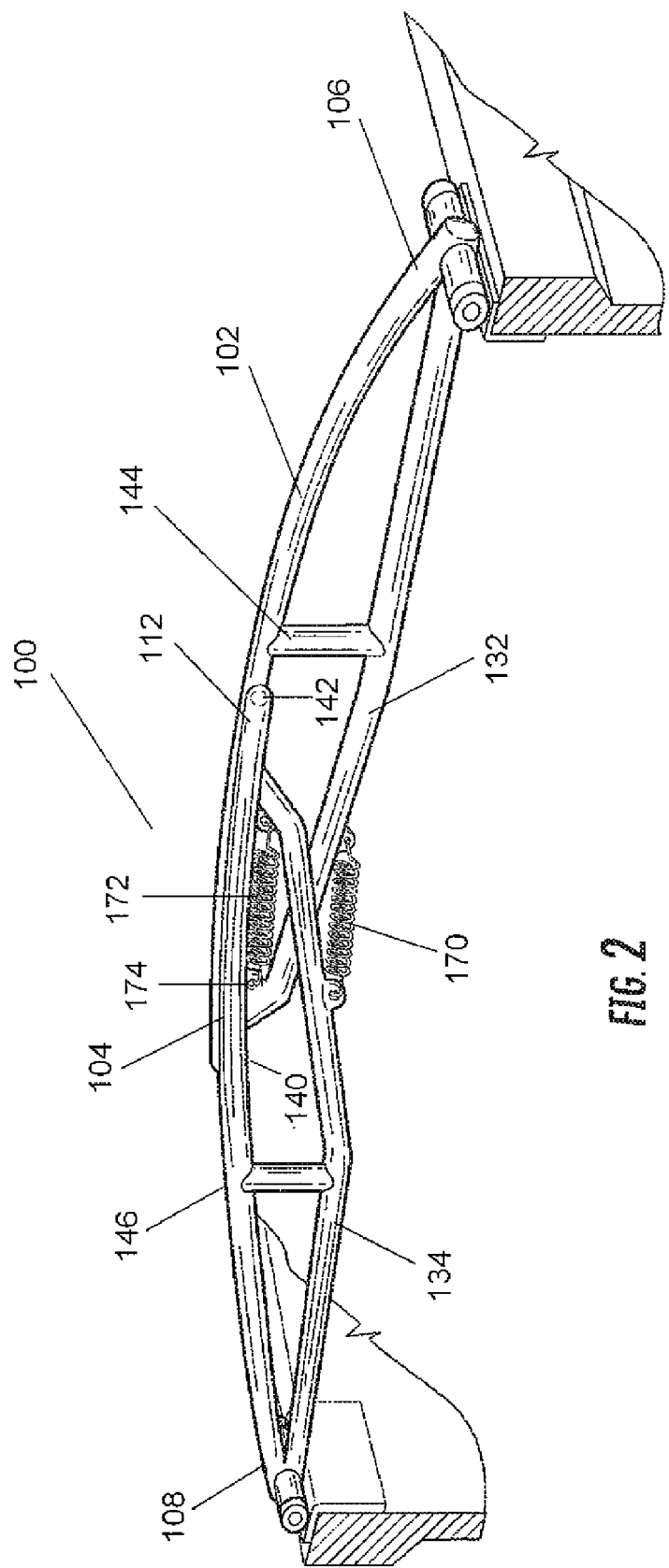
FIG. 2 is a perspective view of the invention.

Now referring to the drawings, FIG. 1 shows a tarpaulin bow 100. The tarpaulin bow comprises a first support arm 102 and a second support arm 104. Each support arm 102, 104 comprise a first end 106, 108 and a second end 110, 112. The support arms 102, 104 may be of any curvature although the preferred embodiment has a curvature of four inches to fourteen inches.

Figure 5:
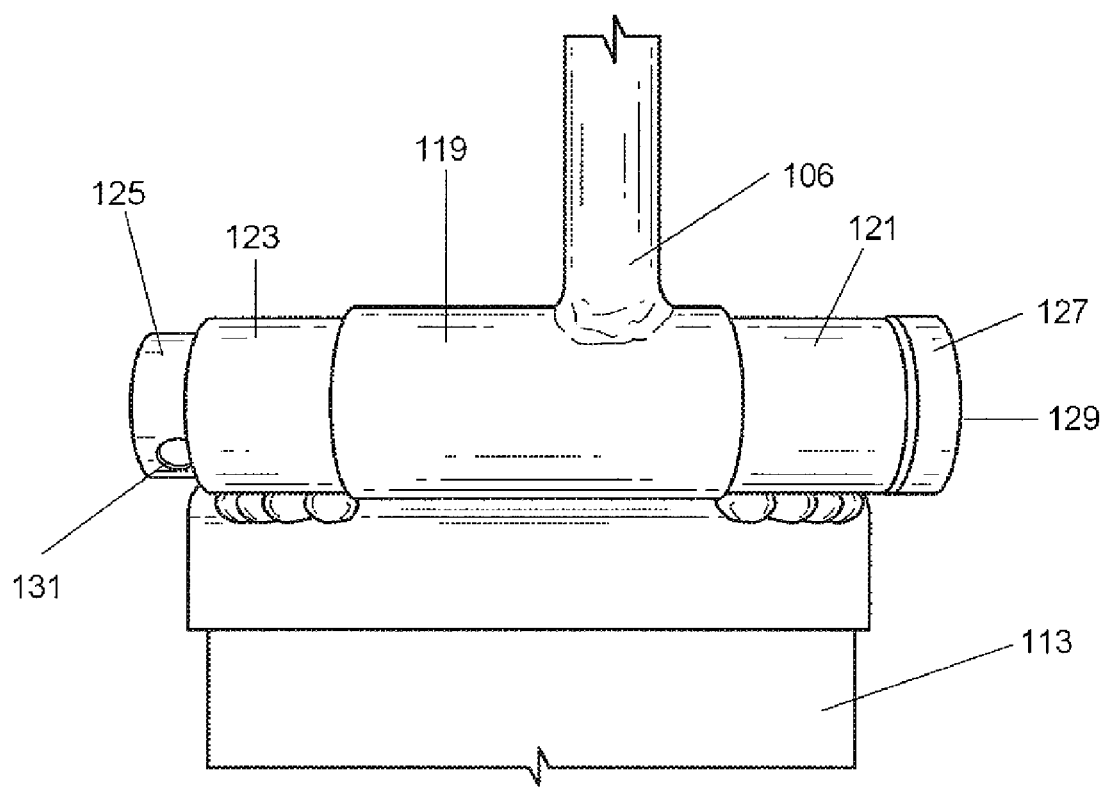
FIG. 5 is a side view of the first end of the invention showing the means for securing the invention to a trailer.
Figure 6:
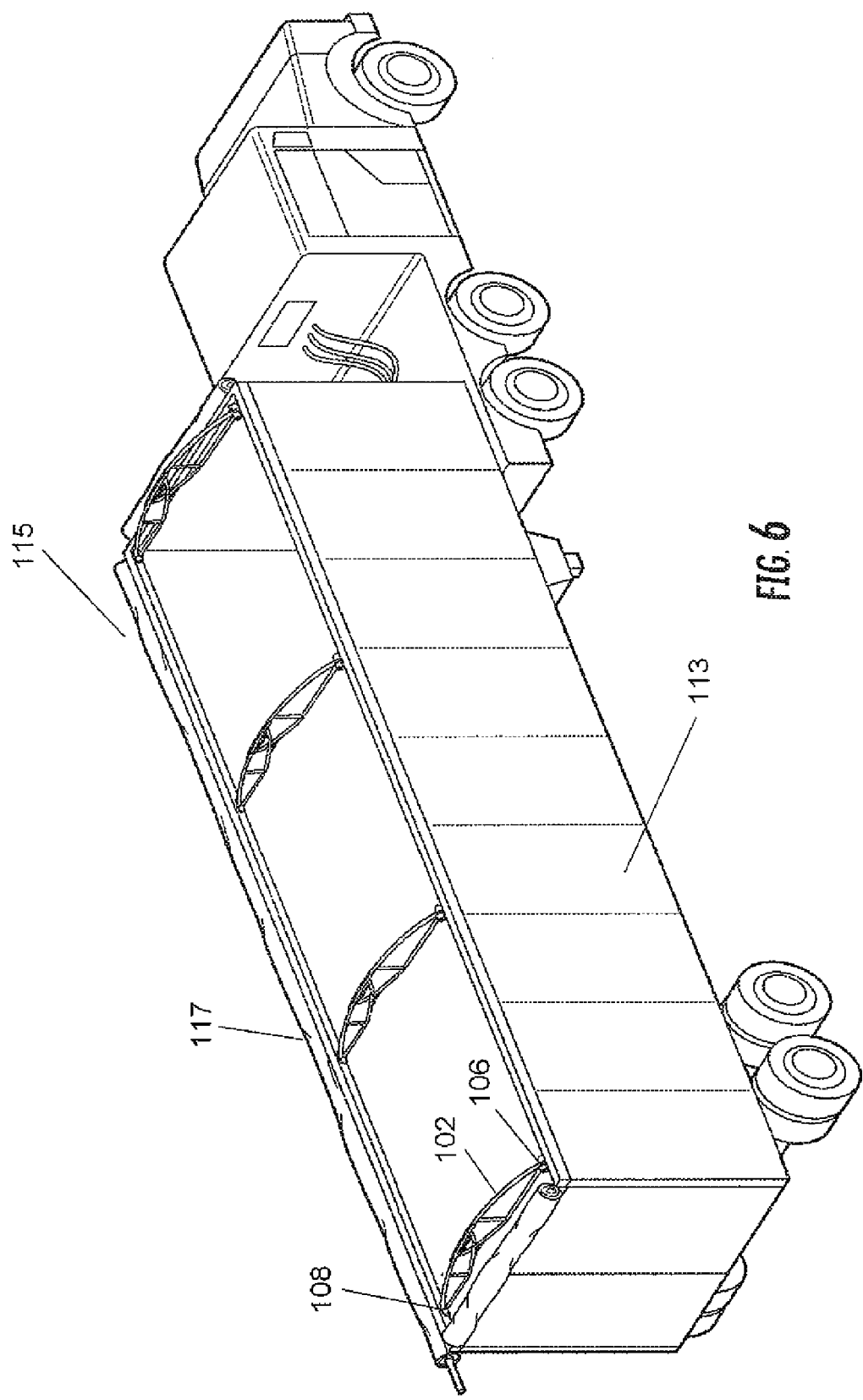
FIG. 6 is a perspective view of the invention showing several tarp bows in accordance with the present invention on a tractor trailer.

Now additionally referring to FIGS. 5 and 6, the first end 106 of the first support arm 102 is selectively attachable to a side wall 113 of a trailer 115. The first end 106 may be attached to the top of the side wall 113 or preferably on the inner side of side wall 113. The first end 108 of the second support arm 104 is selectively attachable to an opposite side wall 117 of the trailer 115 in the same fashion as first end 106. The attachment means may be of any well known techniques in the art. The preferred embodiment utilizes a collar 119 at the first end 106, 108. The collar 119 is a hollow cylinder that fits within the space between trailer collars 121, 123. Once collar 119 is placed between trailer collars 121, 123, a rod 125 is driven through trailer collars 121, 123 and collar 119, securing the support arm 102, 104 to the side wall 113 or opposite side wall 117 respectively. The rod 125 preferably comprises a cap 127 on a first side 129 and a means for receiving a fastening device on the second side 131. The cap 127 is of a sufficient size to prevent the rod 125 from shifting toward the second side 131. Similarly, a fastening device (not shown) may be inserted onto the second side 131 of the rod 125 to prevent the rod 125 from shifting toward the first side 129. The fastening device is selectively removable from the rod 125 which allows the rod 125 to be removed; hence allowing removal of the tarpaulin bow 100 from the trailer 115. The support arms 102, 104 are offset from one another such that the support arms 102, 104 abut one another and form an overlapping area.

Again referring to FIG. 1, the support arms 102, 104 further comprise a lower support member 132, 134 and an upper support member 136, 138. The lower support member 132 of the first support arm 102 converges with the upper support member 136 at the first end 106 and second end 110. Similarly, the lower support member 134 of the second support arm 104 converges with the upper support member 138 at the first end 108 and second end 112. In the preferred embodiment, the convergence at second ends 110, 112 are six to twelve inches from a point 140, 142. A vertical support arm 144, 146 spans between the lower support member 132, 134 and the upper support member 136, 138 respectively. The vertical support arm 144, 146 adds stability to each support arm 102, 104.

Figure 3:
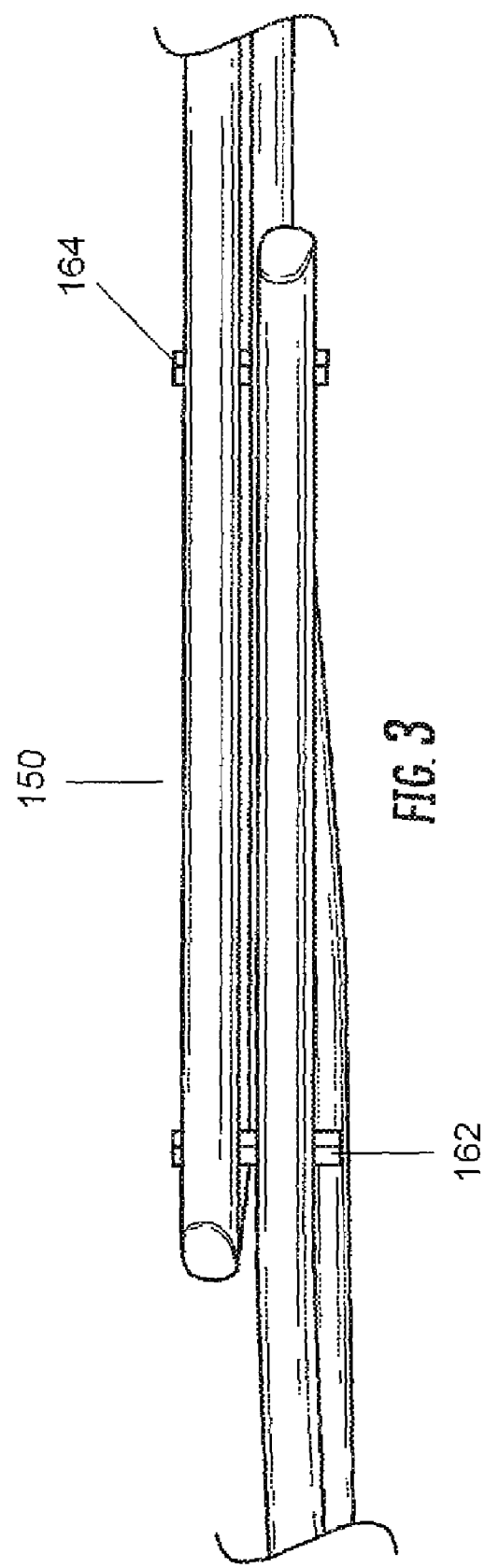
FIG. 3 is a top view of the invention.

Referring additionally to FIG. 3, the first support arm 102 and second support arm 104 are positioned as such that the support arms 102, 104 form an overlapping area 150. The support arms 102, 104 are further positioned on the sidewall 113 and opposite side wall 117 respectively such that the support arms 102, 104 abut one another. The support arms 102, 104 comprise flanges 162, 164. The flanges 162, 164 are preferably located at the second ends 110, 112. Flange 162 extends from the first support arm 102 toward second support arm 104, while flange 164 extends from the second support arm 104 toward support arm 102. The upper support member 136 rests upon flange 164 while the tarpaulin bow 100 is in a first raised position. Similarly, the upper support member 138 rests upon flange 162 while the tarpaulin bow is in a first raised position.

As can be seen in FIG. 1, in addition to the flanges 162, 164, a first spring member 170 and second spring member 172 maintain the support arms 102, 104 in the first raised position. The first spring member 170 and second spring member 172 are preferably extension springs with an initial tension sufficient to maintain the support arms 102, 104 in the first raised position. Although the spring members 170, 172 may be placed in numerous positions, the preferred embodiment locates the spring members 170, 172 within the overlapping area 150. The lower support members comprise two holes 174 which receive the spring members 170, 172. One end of the spring member 170, 172 is attached to the lower support member 130 while the other end of the spring member 170, 172 is attached to the lower support member 134. The spring members' 170, 172 initial tension is such that the support arms 102, 104 are maintained in a raised first position. The spring members 170, 172 also help maintain the support arms' 102, 104 horizontal and lateral positions.

Figure 4:
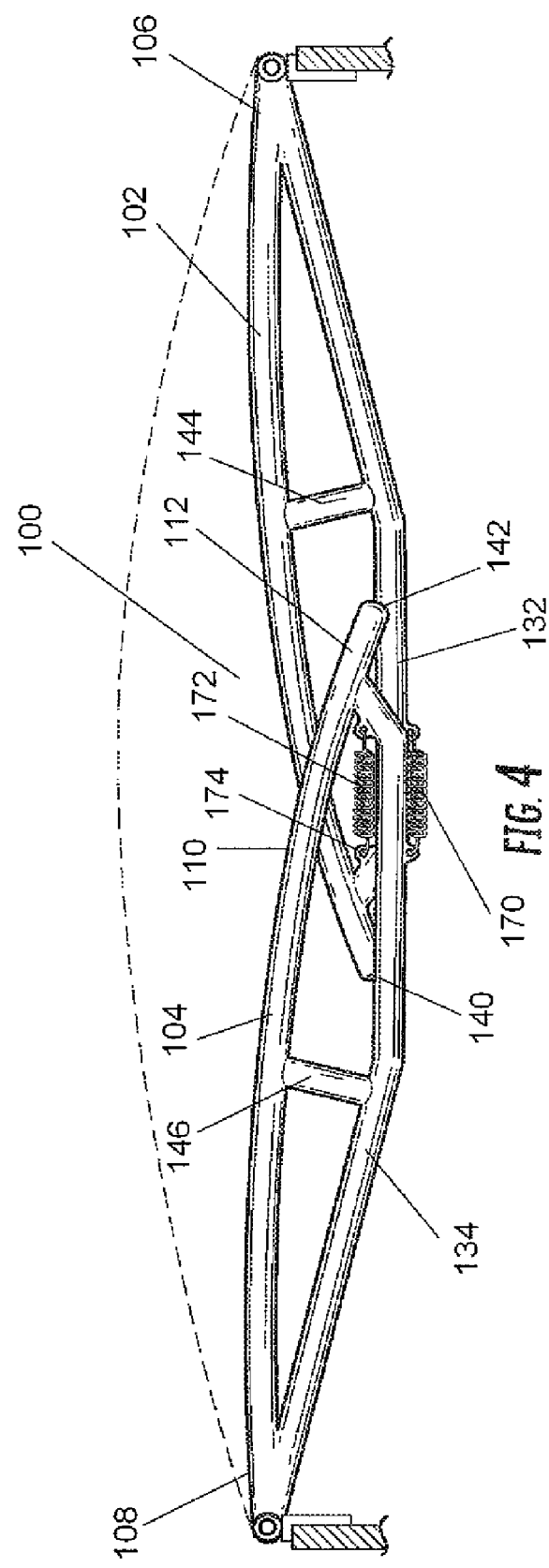
FIG. 4 is a front view of the invention showing the support arms in a displaced position.

Now referring to FIG. 4, the tarpaulin bow 100 can be seen in a second displaced position. As downward force is applied to either the first support arm 102 or the second support arm 104, the initial tension of the spring member 170, 172 is overcome. The support arms 102, 104 are then allowed to move downward in a displaced position. The vertical distance moved depends on the amount of force exerted upon the support member 102, 104. Additionally, the position of the spring members 170, 172 in the preferred embodiment allows the spring members 170, 172 to extend the same distance in response to the downward force. Once the downward force is removed, the tension in the spring members 170, 172 pull the support arms 102, 104 back into the first raised position.

Having thus described the invention in connection with the preferred embodiments thereof, it will be evident to those skilled in the art that various revisions can be made to the preferred embodiments described herein without departing from the spirit and scope of the invention. It is my intention, however, that all such revisions and modifications that are evident to those skilled in the art will be included within the scope of the following claims.

What is claimed is:

1. A device for supporting a tarpaulin covering an open top of a vehicle or trailer comprising:
    a first support member,
    a second support member,
    the first support member and the second support member having a first end and a second end,
    the first end of the first support member attachable to a first wall of the trailer,
    the first end of the second support member attachable to a second wall of the trailer,
    the second wall opposes the first wall,
    the first wall and second wall are separated by a distance,
    the device spans the distance between the first wall and second wall,
    a spring member connects the first support member and the second support member.

2. The invention of claim 1 wherein:
    the first support member comprises a lower arm and an upper arm,
    the second support member comprises a lower arm and an upper arm.

3. The invention of claim 2 wherein:
    the first support member further comprises an inner surface,
    the second support member further comprises an inner surface,
    the first support arm and the second support arm are positioned in such a way that a portion of the inner surface of the first support member abuts a portion of the inner surface of the second support member.

4. The invention of claim 3 wherein:
    the lower arm of the first support member and upper arm of the first support member are joined at the first end to form a first point, the lower arm of the first support member and upper arm of the first support member are joined at the second end to form a second point, the lower arm of the second support member and the upper arm of the second support member are joined at the first end to form a first point, the lower arm of the second support member and the upper arm of the second support member are joined at the second end to form a second point.

5. The invention of claim 4 wherein:

the inner surface of the first support member contains a horizontal flange extending from the second point, the inner surface of the second support member contains a horizontal flange extending from the second point, the first support member rest upon the horizontal flange of the second support member, the seconds support member rests upon the horizontal flange of the first support member.

6. The invention of claim 1 wherein:

a second spring member connects the first support member and the second support member.

7. The invention of claim 1 wherein:

the first spring member has an initial tension to maintain the first support member and the second support member in a first position, the first support member and the second support member move to a second position once the initial tension is overcome.

\* \* \* \* \*